US009684635B2

(12) United States Patent
St. Pierre et al.

(10) Patent No.: US 9,684,635 B2
(45) Date of Patent: Jun. 20, 2017

(54) PACKAGING, DISTRIBUTING, PRESENTING, AND USING MULTI-ASSET ELECTRONIC CONTENT

(75) Inventors: Gregory S. St. Pierre, Hampden, ME (US); Robert Walton, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 533 days.

(21) Appl. No.: 13/205,848

(22) Filed: Aug. 9, 2011

(65) Prior Publication Data

US 2014/0304577 A1  Oct. 9, 2014

Related U.S. Application Data

(60) Provisional application No. 61/454,663, filed on Mar. 21, 2011.

(51) Int. Cl.
*G06F 17/21* (2006.01)

(52) U.S. Cl.
CPC .................................. *G06F 17/21* (2013.01)

(58) Field of Classification Search
CPC .............. G06F 17/30017; G06F 17/24; G06F 17/2247; G06F 3/0438
USPC ........................................ 715/776, 202, 273
See application file for complete search history.

(56) References Cited

U.S. PATENT DOCUMENTS

| 7,562,395 | B2 * | 7/2009 | DeMello et al. ............... 726/27 |
| 8,306,987 | B2 * | 11/2012 | Ber et al. ...................... 707/752 |
| 8,453,051 | B1 * | 5/2013 | Weiss et al. .................. 715/240 |
| 8,479,087 | B2 * | 7/2013 | Swineford et al. ........... 715/202 |
| 2002/0059337 | A1 * | 5/2002 | Takaoka et al. .............. 707/500 |
| 2005/0097007 | A1 * | 5/2005 | Alger et al. .................... 705/26 |
| 2006/0236260 | A1 * | 10/2006 | Turcan et al. ................ 715/776 |
| 2007/0260994 | A1 * | 11/2007 | Sciammarella et al. ...... 715/769 |
| 2008/0091606 | A1 * | 4/2008 | Grecia ............................ 705/51 |
| 2009/0292980 | A1 * | 11/2009 | Swineford et al. ........... 715/202 |
| 2011/0041086 | A1 * | 2/2011 | Kim et al. ..................... 715/764 |
| 2011/0167350 | A1 * | 7/2011 | Hoellwarth ................... 715/727 |
| 2012/0131427 | A1 * | 5/2012 | Artin ............................. 715/201 |
| 2012/0137200 | A1 * | 5/2012 | Shar et al. .................... 715/202 |
| 2012/0233565 | A1 * | 9/2012 | Grant ............................ 715/776 |

\* cited by examiner

*Primary Examiner* — Scott Baderman
*Assistant Examiner* — Seung Jung
(74) *Attorney, Agent, or Firm* — Kilpatrick Townsend & Stockton LLP (57) ABSTRACT

One exemplary embodiment involves receiving, at a computer device, packaged content, wherein the packaged content comprises a manifest and assets. The exemplary method further comprises presenting, via a processor of the computer device, the packaged content in a content consumption environment based at least in part upon the manifest, wherein the manifest identifies stacks, each stack comprising one or more of the assets that are logically related to one another, wherein navigation amongst and within the stacks is specified by the manifest.

24 Claims, 10 Drawing Sheets

PACKAGING, DISTRIBUTING, PRESENTING, AND USING MULTI-ASSET ELECTRONIC CONTENT

CROSS REFERENCE TO RELATED APPLICATION

This application claims priority to U.S. Provisional Patent Application No. 61/454,663, filed Mar. 21, 2011, entitled "PACKAGING, DISTRIBUTING, PRESENTING, AND USING MULTI-ASSET ELECTRONIC CONTENT," the entirety of which is hereby incorporated by reference.

FIELD

This disclosure relates generally to electronic content that is distributed for use on stationary and/or mobile computing devices.

BACKGROUND

Magazines, newspapers, books and other paper-based content packages are used to distribute packaged content. For example, a magazine may package together a number of articles and advertisements that a recipient can read through. Similarly, a book can provide a package of related chapters or other items for use by a reader. Paper-based content packages often include a table of contents, index, and page references that facilitate navigation to desired items within. Paper-based content packages also often include multiple pages that are joined or otherwise bound together in some manner that allows a user to easily flip through the pages at various rates to consume items of interest while skipping quickly through other items.

Electronic content, such as documents, web pages, and rich Internet applications, generally fail to provide readers with easy-navigable, packaged content. Magazines and books that are scanned and provided as documents or web pages, for example, are often cumbersome to view and navigate. The content items may be separated from one another, for example, in the case of web pages, destroying many of the benefits of having such items provided as a single package as provided by paper-based books and magazines. The content items may alternatively and disadvantageously be concatenated in a way such that a reader's navigation is slow and/or difficult. Electronic content that is produced as mere static reproductions of paper-based content, on the other hand, fails to take advantage of the interactivity, electronic advertising, navigation, and other capabilities available in the context of electronic content.

SUMMARY

One exemplary embodiment involves receiving, at a computer device, packaged content, wherein the packaged content comprises a manifest and assets. The exemplary method further comprises presenting, via a processor of the computer device, the packaged content in a content consumption environment based at least in part upon the manifest, wherein the manifest identifies stacks, each stack comprising one or more of the assets that are logically related to one another, wherein navigation amongst and within the stacks is specified by the manifest.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Improved systems and methods for packaging, distributing, presenting, and using packaged electronic content are provided. Navigation amongst various assets of the packaged content is enabled and/or controlled by information provided within the packaged content itself such that a content consumption environment, such as a viewer application used to present the packaged content on a mobile device, can allow a user to navigate amongst and otherwise use the various assets of the packaged content in particular ways specified within the packaged content. For example, presenting packaged content in a content consumption environment may be based at least in part upon a manifest in the packaged content that identifies stacks, each stack comprising one or more of the assets that are logically related to one another, where navigation amongst and within the stacks is specified by the manifest.

The term "packaged content" refers herein to anything comprised of multiple assets. Packaged content may be stored and/or transferred as a file. Packaged content may be formatted as a data-compressed and/or archive-formatted file such as a file compressed using ZIP compression or other data compression and combination technologies. Such a file may allow appending of new assets.

The term "asset" refers herein to an individual content item that may or may not have been separately created from other content items. An asset may itself comprise subparts such as sections, images, text blocks, tables, etc. Exemplary assets include, but are not limited to, text content, image content, video content, sound content, other content types, and combinations thereof. Each asset may be stored or able to be stored or transmitted or able to be transmitted as an individual file, such as a raster image file, portable document format ("PDF") file, hyper-text-markup-language ("HTML") file, Adobe® Flash® formatted content such as a small web format (SWF) file, javascript content, a rich Internet application, and other interactive content. Assets of different kinds may be included in a content package and, in some embodiments, included in a package that is provided as a single file.

The term "stack" refers herein to one or more of the assets that are defined, for example by a manifest, as being logically related to one another. Exemplary stacks include, but are not limited to, articles, chapters, documents, document sections, web pages, web page portions, and other bodies of related text, images, video, sounds, and other content. Stacks of different kinds may be included in a content package and, in some embodiments, included in a package that is provided as a single file. A stack may be defined in different and/or multiple ways. For example, a stack may be defined in both horizontal and vertical orientations in a content package so that the stack has a different appearance depending upon whether a user is viewing the stack with the device held horizontally or held vertically.

The term "manifest" refers herein to information included in packaged content about packaged assets and/or about how such content is used. A manifest may identify the one or more assets of packaged content, identify stacks of assets, provide metadata about the one or more assets and/or stacks, and/or provide information used to view and/or navigate the packaged content in a content consumption environment.

These illustrative examples and terms are described to introduce the reader to the general subject matter discussed here and are not intended to limit the scope of the disclosed concepts. The following sections describe various additional embodiments and examples with reference to the drawings in which like numerals indicate like elements.

Figure 1:
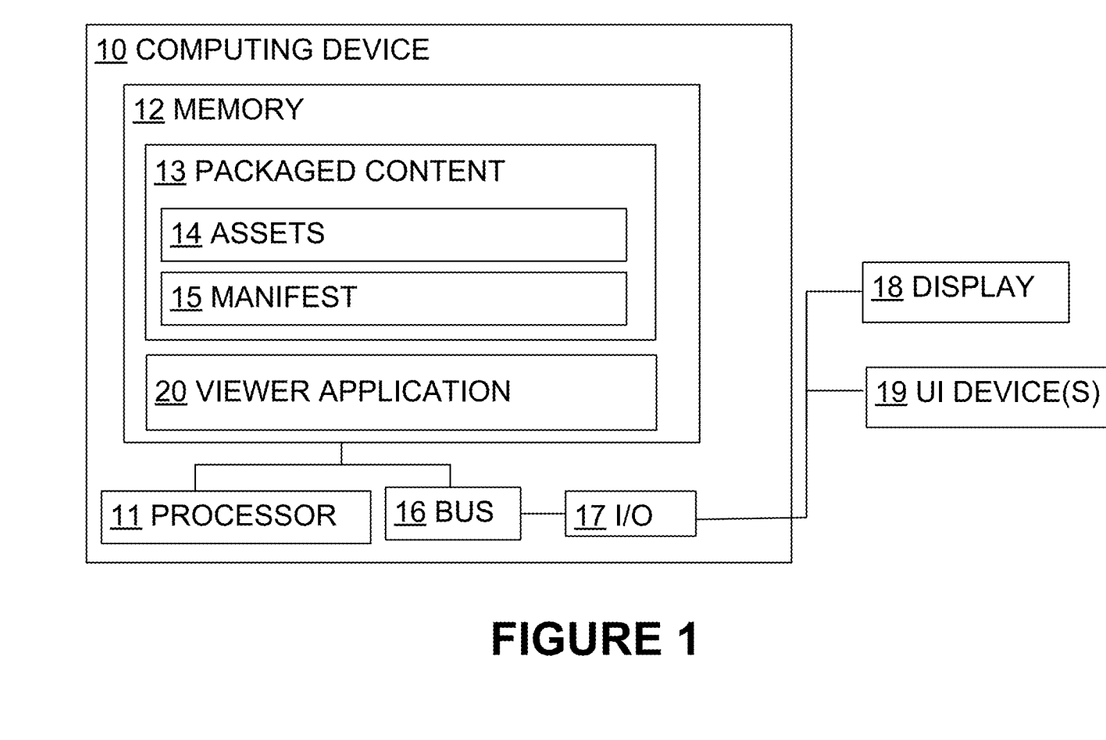
FIG. 1 is a block diagram depicting an exemplary computing device in an exemplary computing environment for implementing certain embodiments.

Referring now to the drawings, FIG. 1 is a block diagram depicting an exemplary computing device in an exemplary computing environment for implementing certain embodiments. Applications and other electronic content execute or are otherwise used on the exemplary computing device 10 and are shown as functional components or modules. As is known to one of skill in the art, such applications and content may be resident in any suitable computer-readable medium and execute on any suitable processor. For example, as shown the device 10 comprises a computer-readable medium such as a random access memory (RAM) 12 coupled to a processor 11 that executes computer-executable program instructions and/or accesses information stored in memory 12. Such a processor 11 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

The client device 10 may also comprise a number of external or internal devices such as a mouse, a CD-ROM, DVD, a keyboard, a display, audio speakers, one or more microphones, or any other input or output devices. For example, device 10 is shown with a display 18 and various user interface devices 19. A bus, such as bus 16, is included in the device 10. Device 10 could be a personal computing device, a mobile device, or any other type of electronic devices appropriate for providing one or more of the features described herein.

FIG. 1 illustrates an exemplary device 10 that comprises, in memory 12, packaged content item 13. Packaged content item 13 comprises assets 14 and a manifest 15. Exemplary device 10 further comprises a viewer application 20 for presenting packaged content 13 in a content consumption environment on device 10, for example, displaying content of the assets 14 on display 18 and receiving user input through UI device(s) 19 to control navigation and other use of the assets 14. The viewer application 20 may use manifest 15, for example, to retrieve information about the assets 14 and/or about how the assets 14 are to be used. The viewer application 20 may use the manifest 15 to identify the assets 14, identify metadata about assets 14, and/or obtain information used to control the viewing, navigation, and/or other use of the assets 14 in the content consumption environment it provides on device 10. The viewing application 20 may be a stand-alone application, part of another application, a plug-in to a web browser or other application, or otherwise provided on device 10. The view application and packaged content may be packaged together and downloaded as a single application or unit.

Packaged content 13 can be provided as a single unit for sale and access purposes. For example, a magazine business entity may provide each of its monthly issues as a separate, individual content package that is available for sale or access. However, even though such packaged content is made available for user purchasing and accessing purposes as a single unit, in one embodiment, the package can be broken into pieces for downloading and subsequent use on a computer device. For example, if a packaged content item providing multiple articles of a magazine issue is available on a web server, a magazine publisher may update only a single article or asset used within the article on the server without having to update the entire package. The viewer application 20 that already has downloaded the packaged content 13 prior to the update may identify that the new article or asset used within the article is available and provide a notification and link for the user to update the packaged content 13 by downloading only that one article or asset that has been updated. Similarly, if a connection drops during downloading of the content package 13, only the yet-to-be-downloaded articles and/or assets of the packaged content 13 need to be downloaded.

Figure 2:
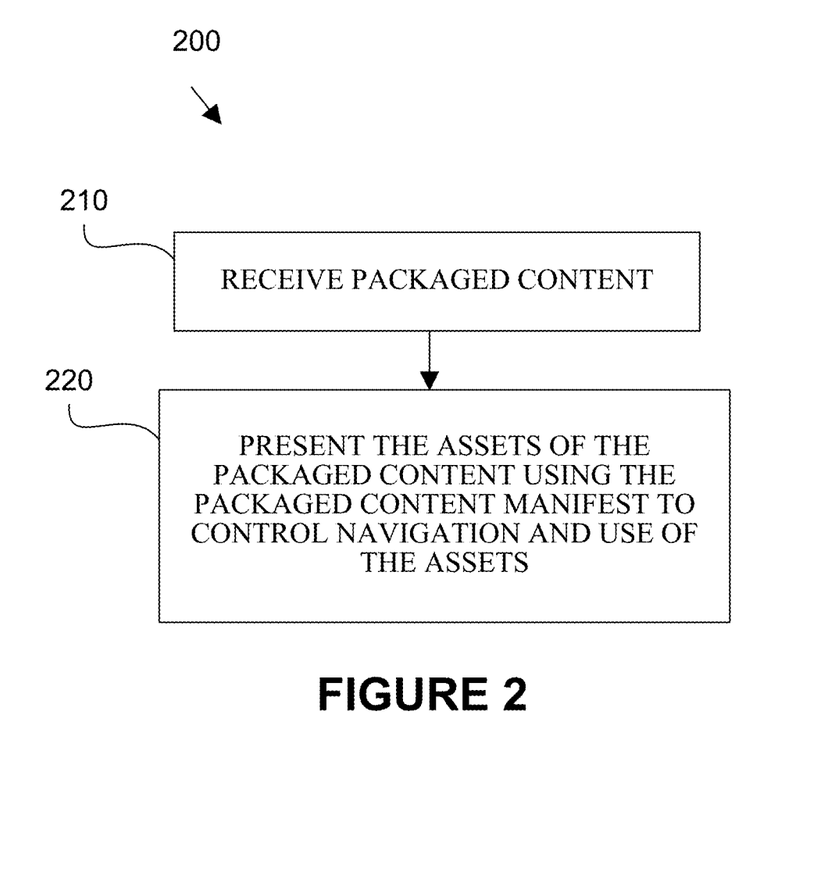
FIG. 2 is a flow chart illustrating an exemplary method of presenting packaged content.

FIG. 2 is a flow chart illustrating an exemplary method 200 of presenting packaged content. Such an exemplary method 200 may be performed on a variety of computer devices including, but not limited to, device 10 of FIG. 1. For illustrative purposes, method 200 of FIG. 2 is described with reference to elements of FIG. 1.

The exemplary method 200 comprises receiving packaged content 13, as illustrated in block 210. Such receiving may involve receiving, at a computer device 10, packaged content 13, wherein the packaged content 13 comprises a manifest 15 and assets 14. The packaged content 13 may be received from a disk, storage device, through a network, or otherwise onto a computer device 10. The packaged content 13 may be received in response to a request, manually, automatically, or otherwise.

The exemplary method 200 further comprises presenting the assets 14 of the packaged content 13 using the packaged content manifest 15 to control navigation and use of the assets 14. For example, such presenting may involve a viewer application 20 presenting the assets 14 of the packaged content 13 in a content consumption environment, in which presentation of the assets 14 is based at least in part upon the manifest 15. The manifest 15 may be interpreted to present the assets in particular stacks, in a particular order, and/or using a particular navigation paradigm. An exemplary navigation paradigm is a two-dimensional("2D")-navigational paradigm in which, for vertical stacks, left/right navigation commands are used to switch from stack to stack and up/down navigation commands are used to navigate within contents of a particular stack. An example of such a 2D-navigational paradigm causes left and right gestures on a touch screen to navigate from stack to stack and up and down gestures on the touch screen to navigate within the contents of the particular stack.

User interface features and functionality may be targeted to provide various benefits in the context of computer devices having a touch screen as a primary or sole input mechanism. For example, a 2D-navigational paradigm may be employed that allows left and right gestures on the touch screen to provide a particular navigation feature and up and down gestures on the touch screen to navigate a different navigation feature. The navigation feature provided by a given gesture or other command may differ depending upon the particular assets, stacks, and/or other context of the content consumption environment. The manifest may be interpreted, in a particular example, such that if a user is viewing page 3 of a first stack, a left to right gesture may navigate to page 1 of the next stack. A subsequent right to left gesture may navigate back to page 3 of the first stack. These navigation paradigms and commands are provided as examples. Other commands and paradigms may additionally or alternatively be employed.

A viewing application 20 on a mobile or other computing device 10 may interpret a manifest 15 to provide an interface that presents and allows navigation within and between the assets 14 presented in various stacks. An exemplary manifest 15 comprises identifications of assets 14 within one or more stacks, identifications of navigation and/or interactions permitted for some or all of the stacks of assets 14, metadata descriptive of the entire content package 13, and metadata descriptive of one or more of the individual assets 14. A manifest 15 may utilize a markup language format or any other suitable format. In one embodiment, a manifest 15 is provided according to an eXtensible Markup Language ("XML") format that utilizes specific tags to identify assets 14, define stacks of assets 14, define the navigation and interaction features available or allowed, define views, and/or provide various other types of metadata.

Packaged content 13 may include or define overlays. An overlay is an item within an asset that overlays some or all of one or more asset's content. An overlay may be interactive, provide functionality, and/or may depend upon state or other shared information. In an exemplary embodiment, packaged content 13 includes assets 14 that reference or link to content that is internal to the packaged content 13, such as to another of the package's articles, or reference or link to content that is external to the packaged content 13, such as to a particular web page. A hyperlink to such a web page may be provided as an overlay. The packaged content 13 may contain identifications and descriptions of overlays, for example, within a manifest 15 that is interpreted by a viewer application 20. Interactive overlays may also be used to enable the playing of content such as a video within a stack such as an article. Interactive overlays may also be used to provide buttons, selectable options, and other controls.

Overlays can be used in stacks defined for use in multiple orientations of the mobile device or the viewer application. In one embodiment, overlays can be placed in different positions in different orientations yet share interactivity state. As a specific example, if an article includes four overlay buttons that are in different positions in the different orientations, selection of one of the buttons may cause one of four different pictures to be displayed in the article, respectively. Button state can be shared across the different orientations. Thus, when the article is being viewed in a vertical orientation and the second button has been selected to display a particular image, the selection of the second button and display of that image is retained when the orientation switches to horizontal.

Packaged content 13 may be configured to provide improved replication of rich print layouts including, but not limited to, layouts that have enhanced typographical abilities. As a particular example, an article may include text that follows a path or that flows from one column to the next.

Packaged content 13 may include metadata to provide various content presentation features, navigation features, and/or to provide other information. One exemplary embodiment comprises a content package for magazine content that includes metadata identifying the name of the magazine, the issue number, table of contents information, and article specific metadata such as the author, title, description of each article. Metadata for each article may also include flags and indications of asset treatment conditions. For example, a kicker flag may be used to indicate that a particular article is to be emphasized, for example, with an overlay label that says "IMPORTANT" or "CHECK THIS OUT." Metadata can be interpreted by a viewer application 20 to provide various presentation and navigational features. For example, table of content metadata may be interpreted to provide a navigable table of content user interface that allows direct navigation to the individual assets 14 of the packaged content 13.

Packaged content 13 may specify, for example, through its metadata, different views, such as a browse view, a flipper view, and/or a scrubber view. A browse view, for example, may provide a zoomed out view of a 2D image showing many of or all of the stacks adjacent to one another. A scrubber view allows a user to easily scan through the packaged content 13 consecutively, for example, by providing one or more thumbnail images of multiple stacks that can be displayed simultaneously because of their smaller size. An HTML asset may be represented in such a view by a thumbnail image that is created at runtime in the viewer application.

Packaged content 13 may include advertisements. For example advertisements may appear during stack-to-stack navigation, as the user navigates from one stack to another. For example, in the 2D-navigation examples provided above in which left/right commands navigate from stack to stack, such a command may also navigate to advertisements. As a specific example, a first left to right gesture may navigate from a first article to a second article and the next left to right gesture may navigate to a full screen (i.e., not within an asset) advertisement being presented. The advertisement may include overlays and/or interactive features. Thus, enticing full page advertisements may be presented as are presented in traditional paper-based advertisements and newspapers. Such full page advertisements may be less objectionable and even desired in the context of a user interface that presents stacks and allows quickly flipping through them such that a user can stop to look at a full page advertisement if enticed by it but is not undesirably slowed down by the existence of the advertisement. The user can simply flip to the next stack. Advertisements may themselves be stacks or treated as stacks for some purposes. For example, a user may navigate to an advertisement while navigating through a listing of ordered stacks even through the advertisement does not appear in a table of contents.

Packaged content 13 may include assets 14 that are formatted in various ways for display purposes. For example, a stack that comprises content of one or more assets that is larger than a display screen can be provided in as page-divided content, smooth scrolling content, or in any other suitable way. The packaged content 13 may include information defining how the assets 14 individually or collectively should be displayed and navigated. In the case of page-divided content for example, navigation may be specified as controlled by up/down gestures that allow consecutive pages to be accessed. In the case of smooth-scrolling content, a similar or different navigation gesture may be used to scroll with content that extends beyond the display boundaries.

Figure 3:
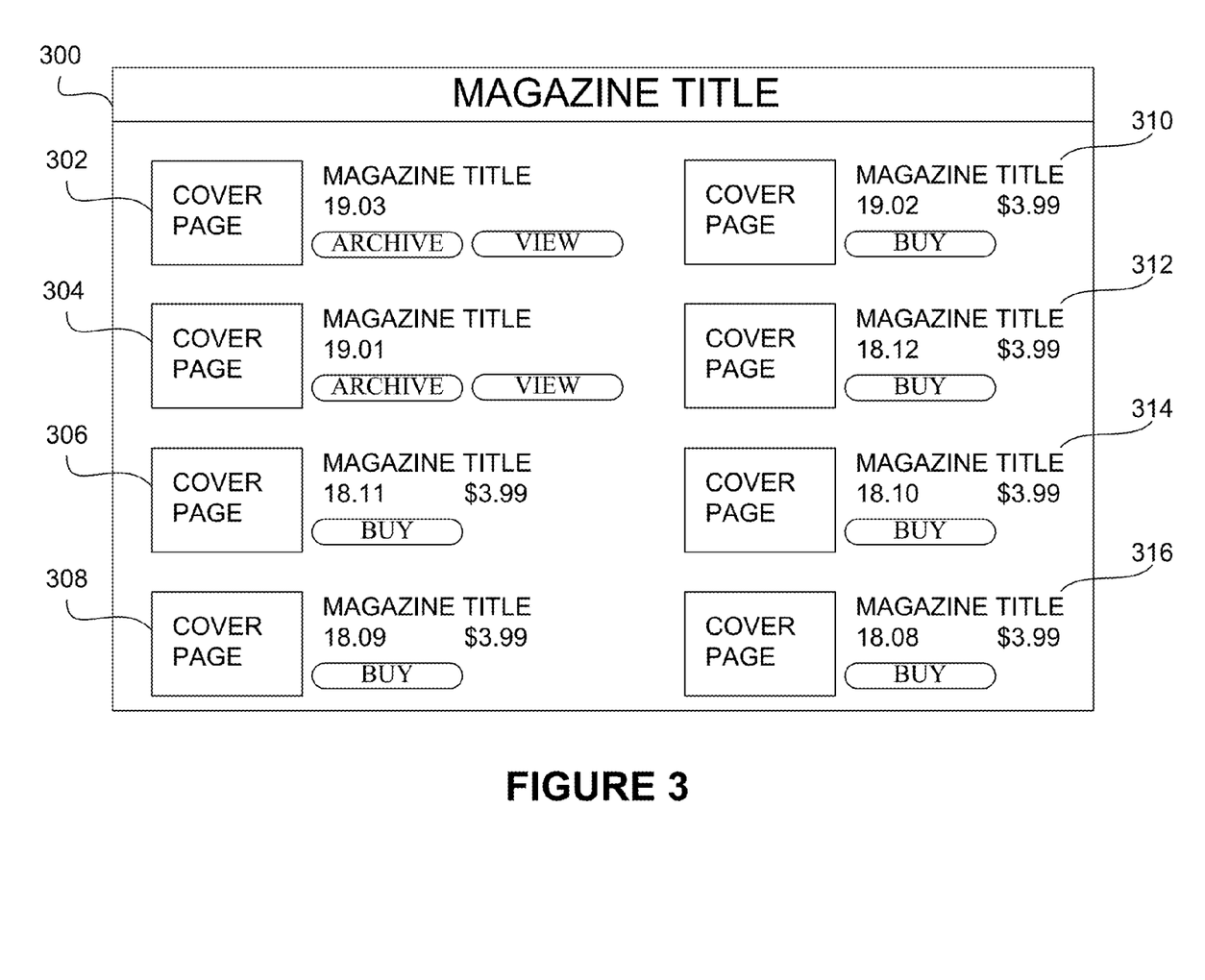
FIG. 3 illustrates a screen shot of a library of multiple content packages available for purchase and viewing.

FIG. 3 illustrates a screen shot 300 of a library of multiple content packages available for purchase and viewing. In this example content packages 302, 304 were already purchased and thus can be archived or viewed using the interface shown on the screen shot 300. In contrast, the other content packages 306, 308, 310, 312, 314, 316 were not previously purchased and thus can be purchased using the interface shown on the screen shot 300.

Figure 4:
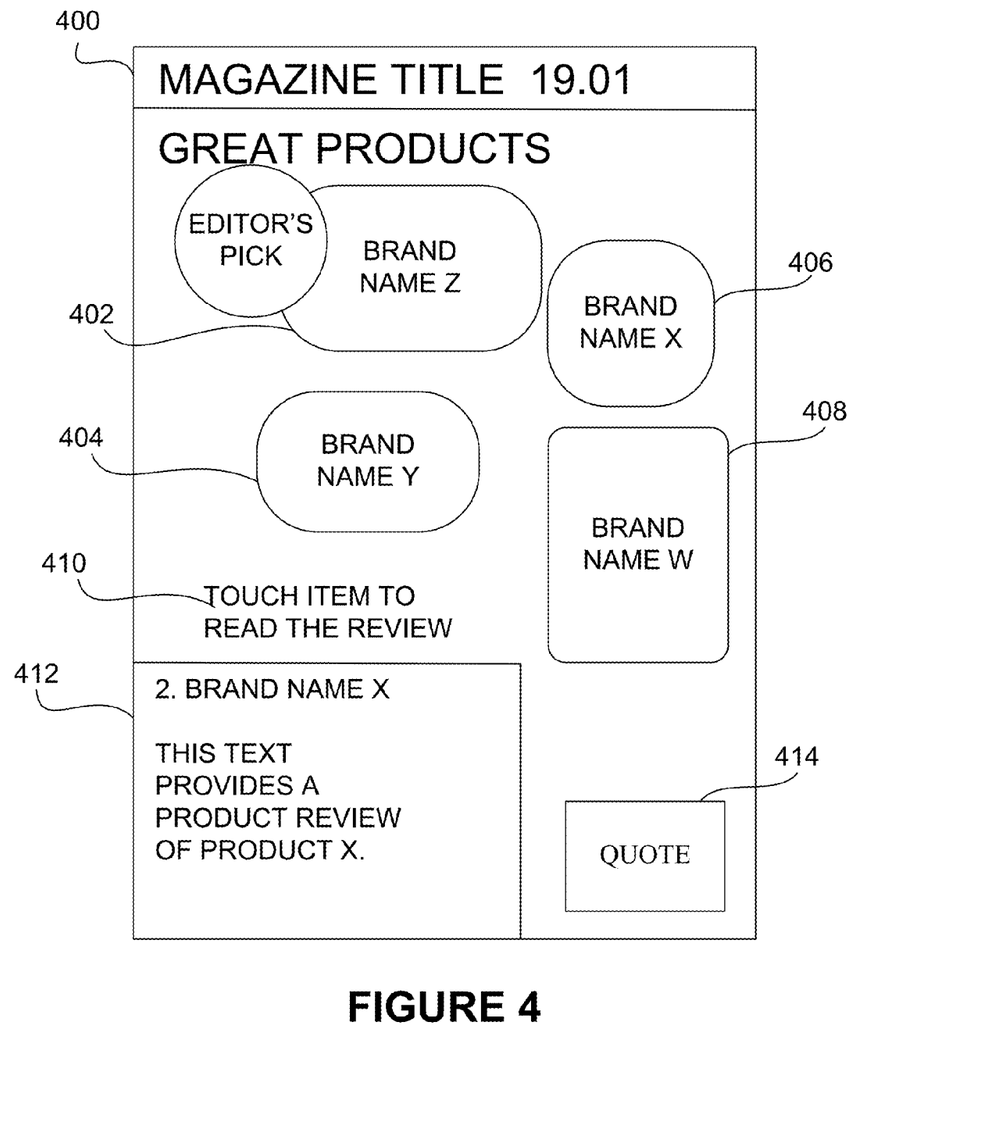
FIG. 4 illustrates a screen shot of content with overlays in a portrait orientations.

FIG. 4 illustrates a screen shot 400 of content with overlays in portrait orientations. The screen shot 400 illustrates the content of an asset, displaying images of several products 402, 404, 406, 408, an instruction to "TOUCH ITEM TO READ THE REVIEW" 410, a description area 412 providing text describing the review for the selected product, and a quote 414. Overlays are defined by the manifest 15 in positions overlaying each of the images of the several products 402, 404, 406, 408 and are used to add the interactivity, i.e., so that touching at the location of one of the images of the several products 402, 404, 406, 408 changes the text displayed in the description area 412.

Figure 5:
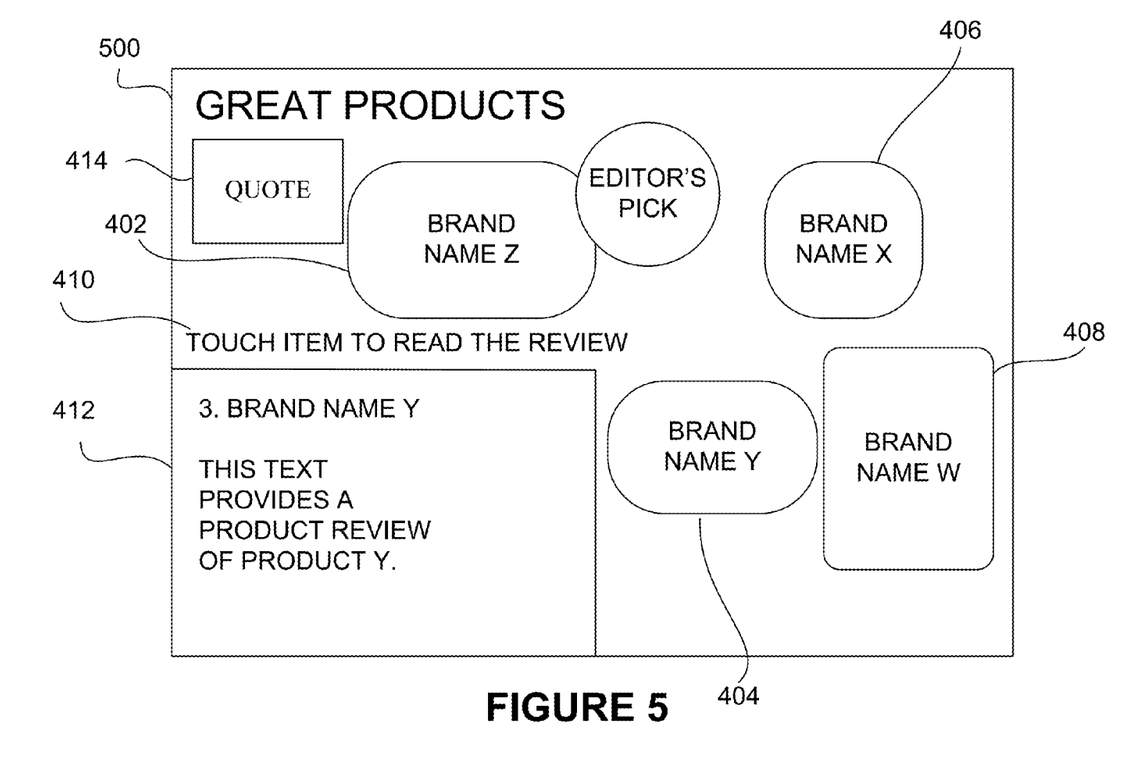
FIG. 5 illustrates a screen shot of the content with overlays of FIG. 4 in a landscape orientation.

FIG. 5 illustrates a screen shot 500 of the content with overlays of FIG. 4 in a landscape orientation. The images of the several products 402, 404, 406, 408, the instruction to "TOUCH ITEM TO READ THE REVIEW" 410, the description area 412 providing text describing the review for the selected product, and the quote 414 appear in different respective positions than in the portrait orientation of FIG. 4. State can be preserved when switching from the portrait orientation of FIG. 4 to the landscape orientation of FIG. 5, for example, such that if a particular product is selected in portrait orientation, that product will continue to appear and be selected upon switching to the landscape orientation.

Figure 6:
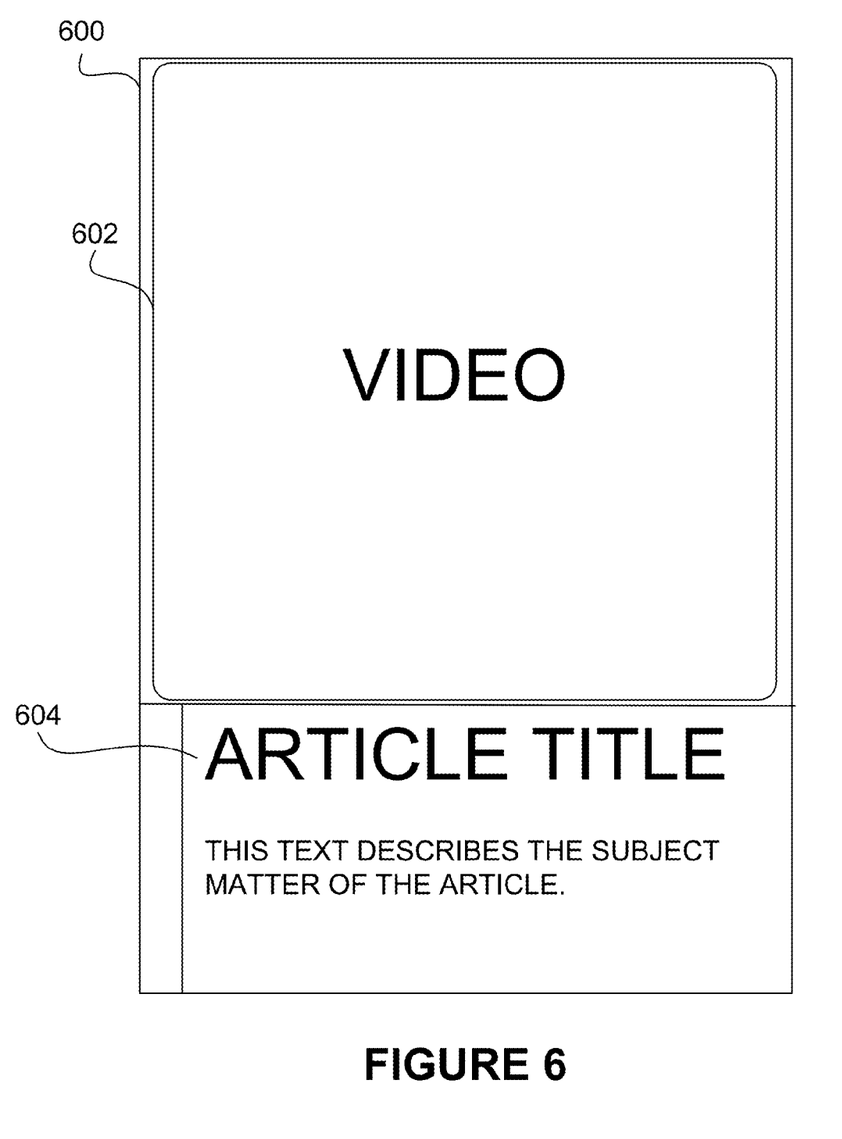
FIG. 6 illustrates a screen shot of a video playing within an article.

FIG. 6 illustrates a screen shot 600 of a video playing within an article. In this example, video 600 is displayed along with the other article content, which is displayed in text area 604. The appearance, playing, and/or user control of the video can be specified in the manifest 15 (FIG. 1) of the electronic content 13 (FIG. 1) comprising the asset as one of its assets 14 (FIG. 1).

Figure 7:
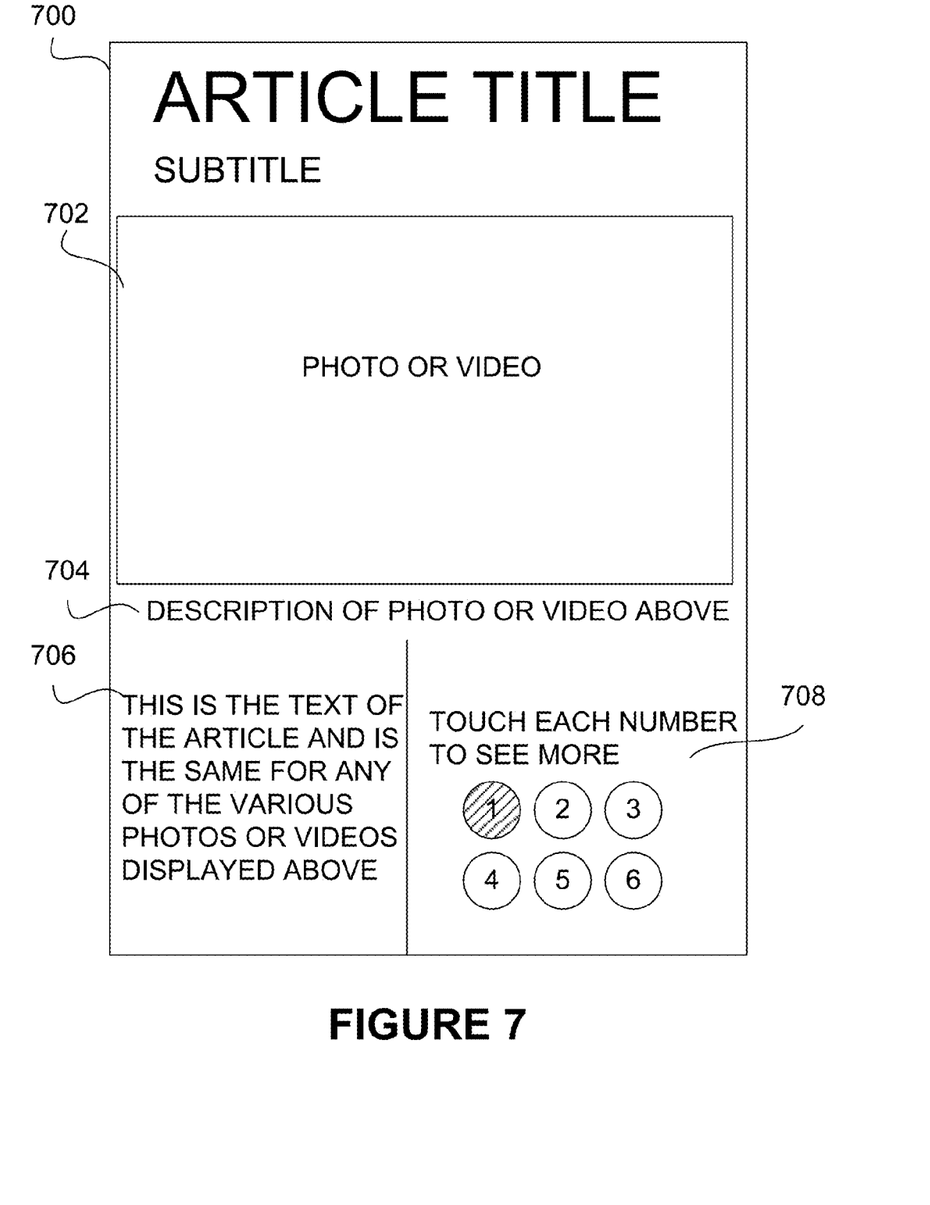
FIG. 7 illustrates a screen shot of a slideshow within an article.

FIG. 7 illustrates a screen shot 700 of a slideshow within an article. In this example, slideshow area 702 is displayed along with the other content, which includes a text description 704 of the slideshow item currently being viewed in slideshow area 702, a text description 706, and an interface feature 708 that receives user selection of a particular number corresponding to a particular slideshow item to be displayed in the slideshow area 702. The appearance, playing, and/or user control of the slideshow can be specified in the manifest 15 of the electronic content 13.

Figure 8:
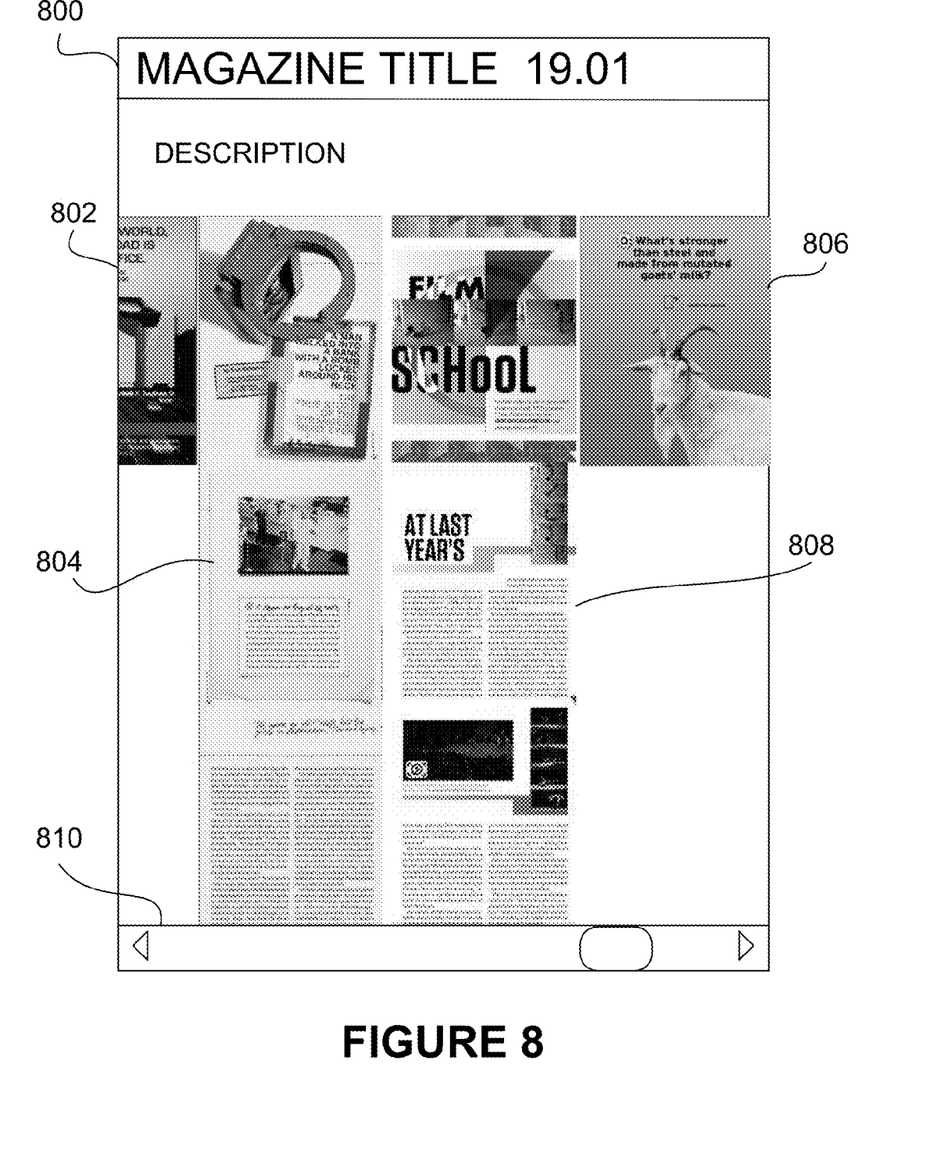
FIG. 8 illustrates a screen shot including a smooth-scrolling article that does not include page breaks.

FIG. 8 illustrates a screen shot 800 including smooth-scrolling articles 804, 808 that do not include page breaks. In this example, articles 802, 804, 806, 808 are positioned side by side and shown simultaneously on the screen shot 800. Additional articles not currently in the screen shot are accessible by horizontal scrolling. Scroll bar 810 shows the current horizontal scrolling position within all of the articles available for viewing in this interface. In this example, each article 802, 804, 806, 808 appears as a smaller than full-size version so that multiple articles can be viewed simultaneously and so that more of the articles having multiple pages and/or smooth-scrolling articles can be viewed. The appearance and/or user interactivity with the interface can be specified in the manifest 15 of the electronic content 13.

Figure 9:
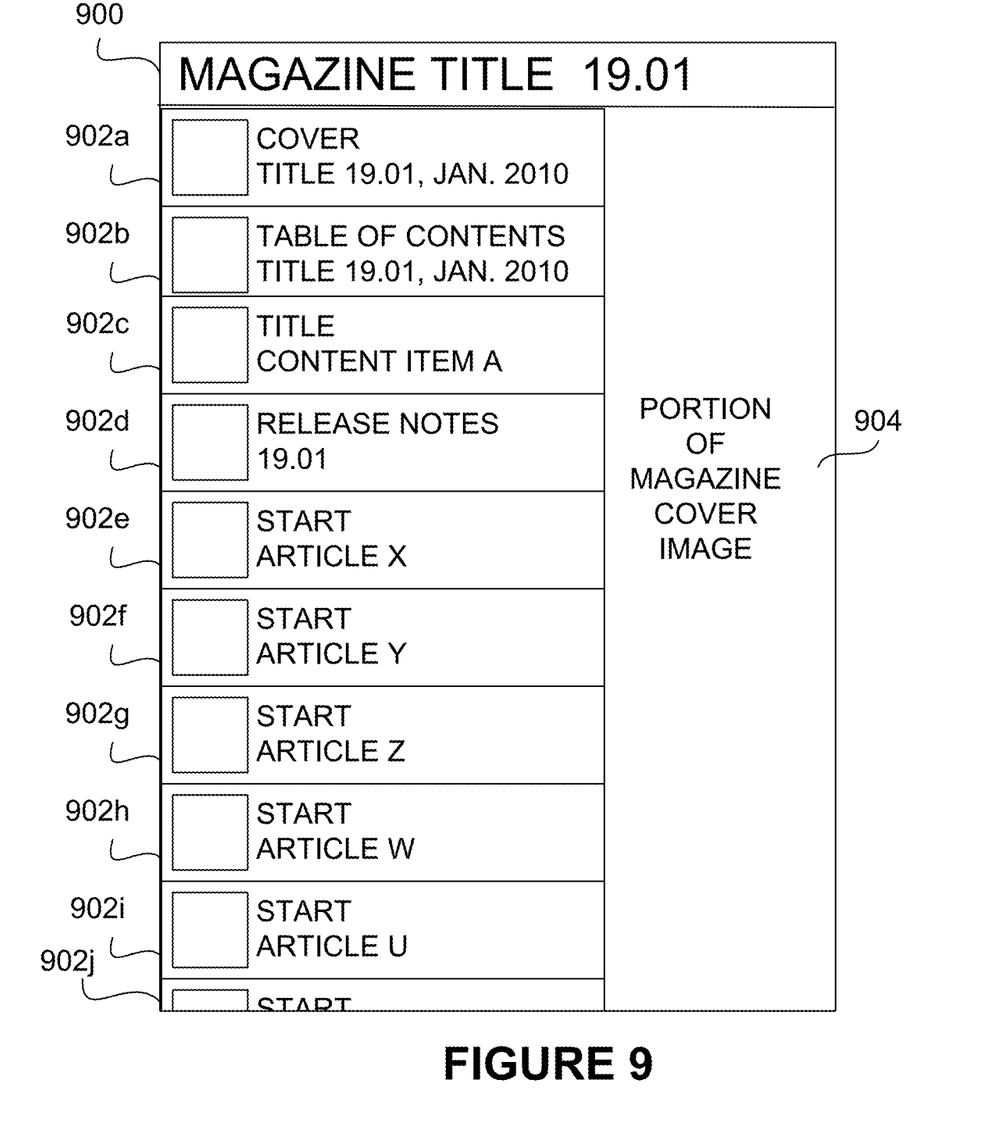
FIG. 9 illustrates a screen shot of a table of content identifying and allowing navigation to multiple articles of packaged content.

FIG. 9 illustrates a screen shot 900 of a table of contents identifying and allowing navigation to multiple of the articles of packaged content 13. The appearance and/or user interactivity with items 902*a-j* of the table of contents can be specified in the manifest 15 of the electronic content 13.

Figure 10:
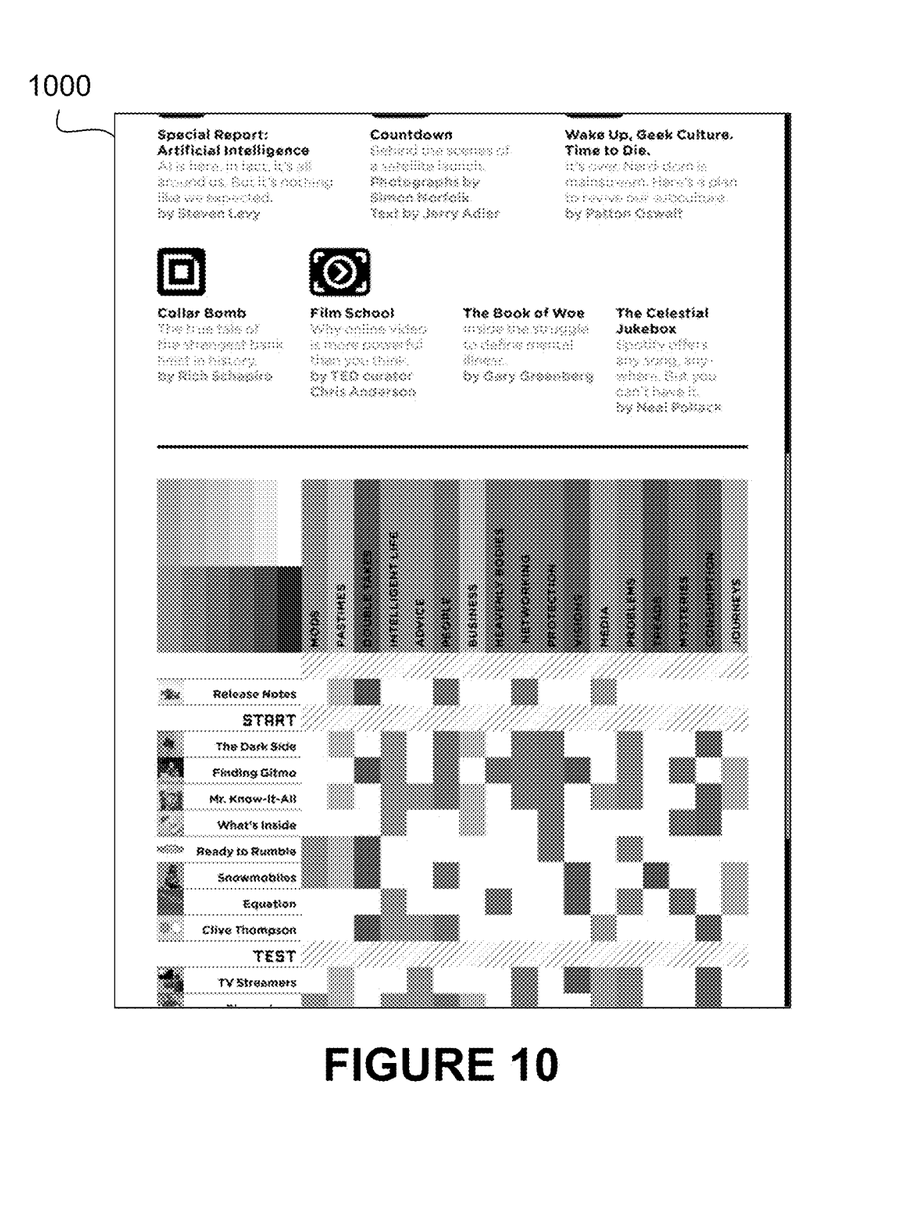
FIG. 10 illustrates a screen shot illustrating an example of a browse viewing mode for viewing multiple articles of a content package.

FIG. 10 illustrates a screen shot 1000 illustrating an example of a browse viewing mode for viewing multiple articles of a content package. The appearance and/or user control of the browse viewing mode can be specified in the manifest 15 of the electronic content 13.

General

Embodiments may be employed on a variety of types of computing devices. Generally, applications and other electronic content executes or is otherwise used on a computer device and can be described in terms of functional components or modules. As is known to one of skill in the art, such applications and content may be resident in any suitable computer-readable medium and execute on any suitable processor. For example, a device may comprise a computer-readable medium such as a random access memory (RAM) coupled to a processor that executes computer-executable program instructions and/or accesses information stored in memory. Such a processor may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Objective-C, Visual Basic, Java, Python, Perl, JavaScript, and ActionScript. Instructions can be stored locally on a device that processes the instructions or may be received over a network such as the Internet from a remote storage device.

A device may also comprise a number of external or internal devices such as a mouse, a CD-ROM, DVD, a keyboard, a display, audio speakers, one or more microphones, or any other input or output devices. For example, a device may include a display, various user interface devices, and a bus. A device could be a personal computing device, a mobile device, or any other type of electronic device appropriate for providing one or more of the features described herein. In one exemplary embodiment, a device is a touch screen device such as a tablet or touch screen mobile phone. In one exemplary embodiment, a diagonally-measured screen size of such a touch screen is within a range of 3 inches to 15 inches, inclusive.

An exemplary device may comprise, in memory, applications for providing and/or using electronic content. Electronic content includes, but is not limited to, electronic documents, text, images, graphics, web pages, applications, and rich Internet applications. An exemplary system could comprise a touch screen to provide display and a UI device. An exemplary device could further comprise a processor for executing instructions stored in computer-readable medium to provide an application for viewing packaged content. Sub-modules may be used to carry out specific functionality.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device. Embodiments of the methods disclosed herein may be performed in the operation of such computing devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
receiving, at a computer device, packaged content, wherein the packaged content comprises a manifest and assets, wherein the manifest specifies different navigation paradigms for different assets such that a same user navigation command is interpreted to specify a first navigation when interacting with a first asset and interpreted to specify a different navigation when interacting with a second asset;
identifying stacks based at least in part on the manifest, each stack comprising one or more of the assets that are logically related to one another, wherein navigation amongst and within the stacks is specified by the manifest; and
presenting, via a processor of the computer device, the packaged content in a content consumption environment based at least in part upon the manifest, wherein presenting the packaged content includes displaying a plurality of stacks, the plurality of stacks configured to be viewed and navigated in the content consumption environment.

2. The method of claim 1 wherein the manifest is interpreted to present the packaged content using a particular navigation paradigm.

3. The method of claim 2 wherein the particular navigation paradigm is a two-dimensional ("2D")-navigational paradigm in which left/right navigation commands are used to switch from a first vertically-laid out stack to a second vertically-laid out stack and up/down navigation commands are used to navigate within each of the first and second vertically-laid out stacks.

4. The method of claim 3 wherein the 2D-navigational paradigm allows left and right gestures on a touch screen to navigate from the first vertically-laid out stack to the second vertically laid out stack and up and down gestures on the touch screen to navigate within each of the first and second vertically-laid out stacks.

5. The method of claim 1 wherein the manifest is interpreted to provide an overlay, wherein the overlay is an item that overlays some or all of a stack, wherein the overlay adds interactivity to the stack.

6. The method of claim 1 wherein the manifest is interpreted to provide an overlay, wherein the overlay is an item that overlays some or all of a stack, wherein the overlay is used to enable playing of a video within content of the stack.

7. The method of claim 1 wherein the manifest is interpreted to provide an overlay, wherein the overlay is an item that overlays some or all of a stack, wherein the overlay displays a feature in different positions in different viewing orientations of the stack, wherein, in either of the different positions, an interactivity state is shared such that the interactivity state is preserved when viewing orientation is switched.

8. The method of claim 1 wherein the manifest is formatted in a markup language format and uses specific tags to specify how navigation is controlled.

9. The method of claim 1 wherein at least one of the assets comprises interactive content, wherein the content consumption environment allows interaction with the interactive content according to the manifest.

10. The method of claim 1 wherein the packaged content is a single file combining assets of different types, wherein the packaged content is formatted as a data-compressed or archive-formatted file.

11. The method of claim 1 wherein each asset is stored as an individual file packaged within the packaged content.

12. The method of claim 11 wherein at least one individual file is a raster image file or a portable document format ("PDF") file.

13. The method of claim 11 wherein at least one individual file is a hyper-text-markup-language ("HTML") file, a Small Web Format (SWF) file, or a rich Internet application.

14. The method of claim 1 wherein the packaged content is purchased and downloaded as a single unit.

15. The method of claim 14 further comprising receiving an update to the packaged content, wherein the packaged content is updated without replacing all of the packaged content.

16. The method of claim 14 wherein, when a connection drops during downloading of the content package, only yet-to-be-downloaded ones of the assets are downloaded to complete receiving of the packaged content.

17. The method of claim 1 wherein the packaged content comprises an electronic magazine issue purchased and downloaded as a single unit, wherein an update to the packaged content updates less than all of the assets of the electronic magazine.

18. The method of claim 17 wherein the manifest comprises metadata identifying a name of the magazine, an issue number, table of contents information, article specific metadata, and one or more indications indicating which articles are to be emphasized with an overlay.

19. The method of claim 1 wherein the manifest specifies a browse view showing many of or all of the stacks adjacent to one another.

20. The method of claim 1 wherein the manifest specifies a flipper view showing one or more thumbnail images of multiple ones of the stacks to be displayed simultaneously.

21. The method of claim 1 wherein presenting the packaged content further comprises displaying a size reduced version of the plurality of stacks simultaneously and adjacent to one another in the content consumption environment for viewing, wherein the size reduced version of the plurality of stacks each comprise one or more assets of the respective stacks.

22. The method of claim 1 further comprising providing a user-interface configured to receive instructions to allow a user to smooth-scroll in the consumption environment to view one or more stacks that are not included in the displayed plurality of stacks.

23. A system comprising:
a processor for executing instructions stored in computer-readable medium on one or more devices providing an application,
the application comprising one or more modules configured to perform the steps comprising:
receiving packaged content comprising a manifest and assets, wherein the manifest specifies different navigation paradigms for different assets such that a same user navigation command is interpreted to specify a first navigation when interacting with a first asset and interpreted to specify a different navigation when interacting with a second asset;
identifying stacks based at least in part on the manifest, each stack comprising one or more of the assets that are logically related to one another, wherein navigation amongst and within the stacks is specified by the manifest; and
presenting the packaged content in a content consumption environment based at least in part upon the manifest, wherein presenting the packaged content includes displaying a plurality of stacks, the plurality of stacks configured to be viewed and navigated in the content consumption environment.

24. A non-transitory computer-readable medium on which is encoded program code, the program code comprising:
program code for receiving packaged content, wherein the packaged content comprises a manifest and assets, wherein the manifest specifies different navigation paradigms for different assets such that a same user navigation command is interpreted to specify a first navigation when interacting with a first asset and interpreted to specify a different navigation when interacting with a second asset;
program code for identifying stacks based at least in part on the manifest, each stack comprising one or more of the assets that are logically related to one another, wherein navigation amongst and within the stacks is specified by the manifest; and
program code for presenting the packaged content in a content consumption environment based at least in part upon the manifest, wherein presenting the packaged content includes displaying a plurality of stacks, the plurality of stacks configured to be viewed and navigated in the content consumption environment.

* * * * *